United States Patent
Oh

(10) Patent No.: US 10,574,957 B2
(45) Date of Patent: Feb. 25, 2020

(54) SOURCE DEVICE AND CONTROL METHOD THEREOF, AND SINK DEVICE AND IMAGE QUALITY IMPROVEMENT PROCESSING METHOD THEREOF

(71) Applicant: SAMSUNG ELECTRONICS CO., LTD., Suwon-si (KR)

(72) Inventor: Sung-bo Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/097,616

(22) Filed: Apr. 13, 2016

(65) Prior Publication Data
US 2016/0323554 A1    Nov. 3, 2016

(30) Foreign Application Priority Data
Apr. 29, 2015  (KR) .................. 10-2015-0060484

(51) Int. Cl.
*H04N 9/64* (2006.01)
*G09G 5/00* (2006.01)
(Continued)

(52) U.S. Cl.
CPC ............. *H04N 9/646* (2013.01); *G09G 5/006* (2013.01); *H04N 5/44* (2013.01); *H04N 5/57* (2013.01);
(Continued)

(58) Field of Classification Search
CPC ...... H04N 9/646; H04N 19/142; H04N 19/46; H04N 19/87; H04N 5/006; H04N 5/44;
(Continued)

(56) References Cited

U.S. PATENT DOCUMENTS

| | | | | |
|---|---|---|---|---|
| 5,852,472 A | * | 12/1998 | Prasad | .................. H04N 7/148 348/211.99 |
| 7,031,513 B1 | * | 4/2006 | Kondo | ..................... G06T 5/20 348/E5.083 |

(Continued)

FOREIGN PATENT DOCUMENTS

| | | |
|---|---|---|
| CN | 1926874 A | 3/2007 |
| CN | 101572779 A | 11/2009 |

(Continued)

OTHER PUBLICATIONS

Nigel Prankard, "CEA Standard, HDR Static Metadata Extensions, CEA-861.3". Jan. 2015, Consumer Electronics Association, total 18 pages, XP017846002.

(Continued)

*Primary Examiner* — Michael Lee
(74) *Attorney, Agent, or Firm* — Sughrue Mion, PLLC

(57) ABSTRACT

A source and a sink device are provided. The sink device includes: an interface configured to receive, from a source device, a content, and image quality-related data regarding a next scene to be output after a scene output from the sink device from among a plurality of scenes forming the content; a storage configured to store the image quality-related data received from the source device; and a processor configured to perform an image quality improvement process with respect to the next scene to be output using the stored image quality-related data.

22 Claims, 11 Drawing Sheets

| A | 0 | ~ | 8 | 9 | A | B | C | D | E | F | 10 | 11 |
|---|---|---|---|---|---|---|---|---|---|---|---|---|
| Char | | | SAM(4C 2D) | | | L3E | 03h | | | | 04 | 07 |
| | | | ID Manufacture Name | | | ID Product Code | ID Serial Number | | | | Week of MP | Year of MP |

| Reserved | Reserved | Reserved | Reserved | UHD Version | UHD | 20:9 | BD Wise |
|---|---|---|---|---|---|---|---|

(51) Int. Cl.
  *H04N 5/44* (2011.01)
  *H04N 21/4363* (2011.01)
  *H04N 21/4402* (2011.01)
  *H04N 21/81* (2011.01)
  *H04N 21/845* (2011.01)
  *H04N 19/46* (2014.01)
  *H04N 5/57* (2006.01)
  *H04N 19/87* (2014.01)
  *H04N 19/142* (2014.01)
  *H04N 7/015* (2006.01)

(52) U.S. Cl.
  CPC ........... *H04N 7/015* (2013.01); *H04N 19/142* (2014.11); *H04N 19/46* (2014.11); *H04N 19/87* (2014.11); *H04N 21/43635* (2013.01); *H04N 21/440245* (2013.01); *H04N 21/816* (2013.01); *H04N 21/8456* (2013.01)

(58) Field of Classification Search
  CPC .... H04N 5/57; H04N 7/015; H04N 21/43635; H04N 21/440245; H04N 21/816; H04N 21/8456; G09G 2320/103; G09G 2370/042; G09G 2370/047; G09G 2370/17
  USPC ....... 348/720, 725, 723, 719, 714, 706, 608, 348/636, 650, 680, 693, 500, 211.1, 348/211.3, 218.1, 231.3, 135, 14.03, 348/14.12, 92, 701, 700, 567, 415.1, 348/416.1, 370, 231.1, 523; 386/200, 386/230, 326, 335, 336, 344, 361; 345/27, 504, 565, 625, 634
  See application file for complete search history.

(56) References Cited

U.S. PATENT DOCUMENTS

| | | | |
|---|---|---|---|
| 7,932,928 B2* | 4/2011 | Koizumi | H04N 1/00188 348/222.1 |
| 8,830,360 B1 | 9/2014 | Burt et al. | |
| 8,982,209 B2 | 3/2015 | Pardue | |
| 2002/0163596 A1* | 11/2002 | Griessl | G06T 7/269 348/701 |
| 2004/0252201 A1* | 12/2004 | Meitav | H04N 1/32128 348/211.3 |
| 2005/0041156 A1* | 2/2005 | Kondo | H04N 5/145 348/700 |
| 2005/0114887 A1* | 5/2005 | Gelissen | H04N 21/235 725/47 |
| 2005/0141853 A1* | 6/2005 | Takemura | H04N 21/2662 386/329 |
| 2005/0175251 A1* | 8/2005 | Taketa | H04N 19/647 382/248 |
| 2005/0195900 A1 | 9/2005 | Han | |
| 2007/0094687 A1* | 4/2007 | Russell | H04N 5/76 725/46 |
| 2007/0140579 A1* | 6/2007 | Miyashita | H04N 9/735 382/254 |
| 2008/0010412 A1* | 1/2008 | Iwata | H04L 1/0045 711/128 |
| 2008/0024666 A1* | 1/2008 | Sudo | H04N 5/44543 348/565 |
| 2008/0259218 A1* | 10/2008 | Kondo | G06K 9/00221 348/700 |
| 2009/0002567 A1* | 1/2009 | Maruyama | G11B 27/28 348/700 |
| 2009/0124211 A1* | 5/2009 | Itoh | H04L 1/0009 455/69 |
| 2009/0153737 A1* | 6/2009 | Glen | G09G 5/006 348/571 |
| 2009/0162029 A1* | 6/2009 | Glen | H04N 5/44543 386/231 |
| 2009/0213916 A1* | 8/2009 | Liu | H04L 12/2898 375/220 |
| 2009/0268097 A1* | 10/2009 | Lin | H04N 19/87 348/700 |
| 2010/0033627 A1* | 2/2010 | Hayashi | G09G 5/005 348/500 |
| 2010/0110292 A1 | 5/2010 | Oh et al. | |
| 2010/0182402 A1* | 7/2010 | Nakajima | G09G 5/006 348/42 |
| 2010/0259691 A1* | 10/2010 | Sasazaki | G09G 5/006 348/723 |
| 2010/0296558 A1* | 11/2010 | Matsushita | H04L 29/12254 375/220 |
| 2010/0297889 A1* | 11/2010 | Teramoto | H01R 13/64 439/660 |
| 2011/0074921 A1* | 3/2011 | Takiduka | H04N 13/004 348/43 |
| 2011/0152729 A1* | 6/2011 | Oohashi | A61M 21/02 601/2 |
| 2011/0222832 A1* | 9/2011 | Aizawa | G11B 19/025 386/200 |
| 2011/0243530 A1* | 10/2011 | Kashima | G06F 17/30799 386/248 |
| 2013/0086601 A1* | 4/2013 | Adimatyam | H04N 21/23424 725/1 |
| 2013/0208984 A1 | 8/2013 | Mase | |
| 2013/0216200 A1* | 8/2013 | Howett | H04N 5/91 386/240 |
| 2013/0234913 A1* | 9/2013 | Thangadorai | G06F 3/1423 345/2.1 |
| 2014/0079113 A1 | 3/2014 | Newton et al. | |
| 2014/0189590 A1 | 7/2014 | Um et al. | |
| 2014/0211097 A1 | 7/2014 | Oh | |
| 2014/0240604 A1* | 8/2014 | Toba | H04N 21/43635 348/723 |
| 2014/0369668 A1* | 12/2014 | Onoda | H04N 5/76 386/248 |
| 2015/0063465 A1* | 3/2015 | Hattori | H04N 9/73 375/240.25 |
| 2015/0103919 A1* | 4/2015 | Hattori | H04N 19/124 375/240.25 |
| 2015/0215674 A1* | 7/2015 | Provencher | H04N 21/4725 725/60 |
| 2015/0310896 A1* | 10/2015 | Bredow | G06F 3/0488 386/230 |
| 2016/0180491 A1* | 6/2016 | Lin | G09G 5/363 345/503 |
| 2017/0070701 A1* | 3/2017 | Nakajima | H04N 21/436 |

FOREIGN PATENT DOCUMENTS

| | | |
|---|---|---|
| CN | 103905753 A | 7/2014 |
| EP | 2 187 382 A2 | 5/2010 |
| WO | 2015/050857 A1 | 4/2015 |

OTHER PUBLICATIONS

Communication dated Jul. 12, 2016, issued by the European Patent Office in counterpart European Application No. 16163398.7.
International Search Report for PCT/KR2016/003370 dated Jul. 22, 2016 [PCT/ISA/210].
Written Opinion for PCT/KR2016/003370 dated Jul. 22, 2016 [PCT/ISA/237].
Communication issued Mar. 10, 2017, issued by the European Patent Office in counterpart European Patent Application No. 16163398.7.
Communication dated Nov. 17, 2017, from the European Patent Office in counterpart European Application No. 16163398.7.
Communication dated Jun. 11, 2018 by the European Patent Office in counterpart European Patent Application No. 16163398.7.

(56) References Cited

OTHER PUBLICATIONS

Communication dated Aug. 5, 2019, from the State Intellectual Property Office of People's Republic of China in counterpart Application No. 201680024316.1.

* cited by examiner

FIG. 3

| | | | | | | | | |
|---|---|---|---|---|---|---|---|---|
| InfoFrame Type Code | \multicolumn{8}{c}{InfoFrame Type = 0x03} |
| InfoFrame Version Number | \multicolumn{8}{c}{Version = 0x01} |
| Length of Source Poroduct Description InfoFrame | \multicolumn{8}{c}{Length of Source Product Description InfoFrame = 25} |
| Data Byte 1 | Scene_transition_flag | Null_Metadata_Scene | Reserved | Reserved | Metadata_Present | Reserved | UHD_Version | UHD_Version |
| Data Byte 2 | \multicolumn{8}{c}{Metadata packet size [Max 255packet]} |
| Data Byte 3 | \multicolumn{8}{c}{UHD Metadata Byte 1} |
| Data Byte 4 | \multicolumn{8}{c}{UHD Metadata Byte 2} |
| Data Byte 5 | \multicolumn{8}{c}{UHD Metadata Byte 3} |
| Data Byte 6 | \multicolumn{8}{c}{UHD Metadata Byte 4} |
| Data Byte 7 | \multicolumn{8}{c}{UHD Metadata Byte 5} |
| Data Byte 8 | \multicolumn{8}{c}{UHD Metadata Byte 6} |
| Data Byte 9 | \multicolumn{8}{c}{UHD Metadata Byte 7} |
| Data Byte 10 | \multicolumn{8}{c}{UHD Metadata Byte 8} |
| Data Byte 11 | \multicolumn{8}{c}{UHD Metadata Byte 9} |
| Data Byte 12 | \multicolumn{8}{c}{UHD Metadata Byte 10} |
| Data Byte 13 | \multicolumn{8}{c}{UHD Metadata Byte 11} |
| Data Byte 14 | \multicolumn{8}{c}{UHD Metadata Byte 12} |
| Data Byte 15 | \multicolumn{8}{c}{UHD Metadata Byte 13} |
| Data Byte 16 | \multicolumn{8}{c}{UHD Metadata Byte 14} |
| Data Byte 17 | \multicolumn{8}{c}{UHD Metadata Byte 15} |
| Data Byte 18 | \multicolumn{8}{c}{UHD Metadata Byte 16} |
| Data Byte 19 | \multicolumn{8}{c}{UHD Metadata Byte 17} |
| Data Byte 20 | \multicolumn{8}{c}{UHD Metadata Byte 18} |
| Data Byte 21 | \multicolumn{8}{c}{Scene_No} |
| Data Byte 22 | \multicolumn{8}{c}{Metadata_Scene_No} |
| Data Byte 23 | \multicolumn{8}{c}{Metadata_Divide_No} |
| Data Byte 24 | Reserved | Reserved | Reserved | Reserved | Reserved | BD Wise3 | BD Wise2 | BD Wise1 |
| Data Byte 25 | \multicolumn{8}{c}{Source Information} |

FIG. 4A

| Address | Bytes | Description | Format |
|---|---|---|---|
| 00h | 8 | Header: = (00 FF FF FF FF FF FF 00)h | See Section 3.3 |
| 08h | 10 | Vendor & Product Identification: | See Section 3.4 |
| 08h | 2 | ID Manufacturer Name | ISA 3-character ID Code |
| 0Ah | 2 | ID Product Code | Vendor assigned code |
| 0Ch | 4 | ID Serial Number | 32-bit serial number |
| 10h | 1 | Week of Manufacture | Week number of Model Year Flag |
| 11h | 1 | Year of Manufacture or Model Year | Manufacture year or Model Year |

SOURCE DEVICE AND CONTROL METHOD THEREOF, AND SINK DEVICE AND IMAGE QUALITY IMPROVEMENT PROCESSING METHOD THEREOF

CROSS-REFERENCE TO RELATED APPLICATIONS

This application claims priority from Korean Patent Application No. 10-2015-0060484, filed on Apr. 29, 2015, in the Korean Intellectual Property Office, the disclosure of which is incorporated herein by reference in its entirety.

BACKGROUND

Field

Apparatuses and methods consistent with exemplary embodiments broadly relate to a source device and a control method thereof, and a sink device and an image quality improvement processing method thereof, and more particularly, to a source device and a control method thereof, and a sink device and an image quality improvement processing method thereof, which provide image quality-related data and perform an image quality improvement process using the image quality-related data.

Description of the Related Art

The representative examples of a recording medium for recording and reproducing high-quality videos and audios are a Digital Versatile Disk (DVD), and a Blu-ray disk, etc. In addition, various kinds of display apparatuses which can display high-quality images are widely used.

In particular, display apparatuses having the ability to process High Dynamic Range (HDR) images come into the market in recent years, and users can enjoy the HDR images having high level image quality.

However, since such display apparatuses do not perform an image quality improvement process considering various image quality-related parameters regarding contents, they have a limit to outputting images with image quality close to original image quality.

SUMMARY

Exemplary embodiments may overcome the above disadvantages and other disadvantages not described above. Also, the present disclosure is not required to overcome the disadvantages described above, and an exemplary embodiment may not overcome any of the problems described above.

An exemplary embodiment provides a source device and a control method thereof, and a sink device and an image quality improvement processing method thereof, which transmit image quality-related data regarding a content one scene early or one scene before the scene is output, and thus perform an image quality improvement process with respect to images forming a scene to be output using the image quality-related data transmitted in advance.

According to an aspect of an exemplary embodiment, a sink device includes: an interface configured to receive, from a source device, content and image quality-related data such that a scene, from among a number of scenes forming the content, is received with the image quality-related data regarding a next scene to be output after the scene; a storage configured to store the image quality-related data received by the interface; and a processor configured to perform an image quality improvement process with respect to the next scene to be output using the image quality-related data stored in the storage.

The image quality-related data received by the interface may be in a divided form.

The processor may be configured to determine a number of the divided image quality-related data and an order of the divided image quality-related data based on information received from the source device, and restore the divided image quality-related data to original image quality-related data which is the same as before the image quality-related data is divided.

The sink device may include a display, which is configured to output content. The processor of the sink device may be configured to determine a time at which a scene is changed based on information received from the source device, and perform the image quality improvement process with respect to the next scene using the image quality-related data stored by the storage during the outputting the next scene by the display.

The processor may be configured to determine a scene number of the next scene based on information received from the source device, and determine whether or not the stored image quality-related data is applicable to the next scene based on the scene number determined by the processor.

The interface may be connected with the source device through an HDMI, and the image quality-related data may be received by the interface in an SPD infoframe.

According to another aspect of an exemplary embodiment, a source device includes: an interface configured to transmit content to the sink device which reproduces the content; and a processor configured to control the interface to transmit, to the sink device, image quality-related data along with the content such that a scene from among a plurality of scenes forming the content is transmitted with the image quality-related data regarding a next scene to be output after the scene.

The processor may be configured to divide the image quality-related data regarding the next scene, and transmit, to the sink device, the image quality-related data divided by the processor.

The processor may be configured to transmit, to the sink device, at least one of: information about division of the image quality-related data, information about a time at which the scene transmitted to the sink device is changed, information about the scene, and information about the image quality-related data.

The processor may be configured to determine whether or not the sink device is able to perform an image quality improvement process based on EDID received from the sink device, and, in response to the processor determining that the sink device is able to perform the image quality improvement process, transmit the image quality-related data to the sink device.

According to another aspect of an exemplary embodiment, an image quality improvement processing method includes: receiving, from a source device, content and image quality-related data such that a scene, from among a plurality of scenes from the content, is received with the image quality-related data regarding a next scene to be output after the scene; storing the received image quality-related data; and performing an image quality improvement process with respect to the next scene using the stored image quality-related data.

The image quality-related data may be received in a divided form from the source device.

The image quality improvement processing method may further include determining a number of the divided image quality-related data and an order of the divided image quality-related data based on information received from the source device, and restoring the divided image quality-related data to original image quality-related data which is the same as before the image quality-related data is divided.

The sink device may output the content which includes the plurality of scenes. The performing the image quality improvement process may include determining a time at which a scene is changed based on information received from the source device, and performing the image quality improvement process with respect to the next scene using the stored image quality-related data during the outputting of the next scene.

The image quality improvement processing method may further include determining a scene number of the next scene based on information received from the source device, and determining whether the stored image quality-related data is applicable to the next scene based on the determined scene number.

The receiving from the source device may be through an HDMI, and the image quality-related data may be received in an SPD infoframe.

According to yet another aspect of an exemplary embodiment, a method of controlling a source device includes: obtaining content and image quality-related data; and transmitting, to a sink device which reproduces the content, the content and the image quality-related data such that a scene from among a plurality of scenes forming the content is transmitted with the image quality-related data regarding a next scene to be output after the scene.

The method may further include dividing the image quality-related data regarding the next scene, and transmitting the divided image quality-related data to the sink device.

The control method may further include transmitting, to the sink device, at least one of: information about division of the image quality-related data, information about a time at which the scene transmitted to the sink device is changed, information about the scene, and information about the image quality-related data.

The method may include determining whether or not the sink device is able to perform an image quality improvement process based on EDID received from the sink device, and, in response to the determining that the sink device is able to perform the image quality improvement process, the transmitting may include transmitting the image quality-related data to the sink device.

According to various exemplary embodiments, since the image quality-related data regarding the content can be used for the image quality improvement process, the images can be output with image quality which is as close as possible to the image quality of the original content, so that improved image quality can be provided to the user.

Additional and/or other aspects and/or advantages of the invention will be set forth in part in the description which follows and, in part, will be obvious from the description, or may be learned by practice of the present disclosure. Exemplary embodiments address at least the above problems and/or disadvantages and other disadvantages not described above. Also, the exemplary embodiments are not required to overcome the disadvantages described above, and an exemplary embodiment may not overcome any of the problems described above.

BRIEF DESCRIPTION OF THE DRAWINGS

The above and/or other aspects will be more apparent by describing certain exemplary embodiments with reference to the accompanying drawings, in which:

FIG. 3 is a view illustrating information inserted into an SPD Infoframe according to an exemplary embodiment;

FIGS. 4A and 4B are views illustrating an EDID structure according to an exemplary embodiment;

DETAILED DESCRIPTION OF EXEMPLARY EMBODIMENTS

Figure 1:
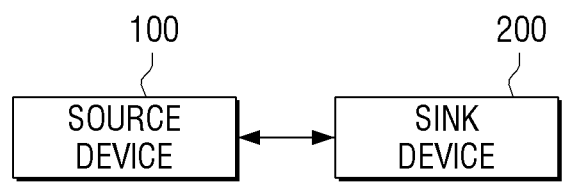
FIG. 1 is a view illustrating an image quality improvement system according to an exemplary embodiment.

Exemplary embodiments may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe exemplary embodiments, but are not intended to limit the scope of the disclosure. The singular expression also includes the plural meaning as long as it does not require a different meaning in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In an exemplary embodiment, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, exemplary embodiments will be explained in greater detail with reference to the accompanying drawings.

FIG. 1 is a view illustrating an image quality improvement system according to an exemplary embodiment. Referring to FIG. 1, the image quality improvement system includes a source device 100 and a sink device 200.

The source device 100 transmits content to the sink device 200. That is, the source device 100 may serve as a content output device to provide content to the sink device 200.

In an exemplary embodiment, the content may be pre-stored in the source device 100 or the source device 100 may receive content from an external medium such as a DVD, a Blu-ray disk, a Universal Serial Bus (USB), an external hard disk, or the like, and transmit the content to the sink device 200.

In addition, the source device 100 may receive broadcast signals from a broadcasting station, and transmit content included in the broadcast signals to the sink device 200, or may download content or receive a stream of content from an external server (not shown) through the Internet, and transmit the content to the sink device 200.

The content recited herein is a High Dynamic Range (HDR) content, such as a movie or a drama produced in the HDR, and for example, may include an Ultra High Definition (UHD) image or a Super-UHD (S-UHD) image which is produced by applying HDR image technology, and an audio related to the image.

In addition, the source device 100 may transmit image quality-related data regarding the content to the sink device 200.

Specifically, since the content is formed of a plurality of scenes, the source device 100 may transmit image quality-related data regarding each of the scenes to the sink device 200.

The scene recited herein, in an exemplary embodiment, refers to a part of a movie or a drama in which a series of actions or talks happen continuously in the same place and time. That is, a plurality of shots may form a single scene (or a single shot may form a single scene), and one of the sequences may be a single scene.

The sink device 200 may output the content which is received from the source device 100.

In an exemplary embodiment, since the content is the HDR content, the sink device 200 may be implemented by using a content display apparatus which can support the HDR content. For example, the sink device 200 may be implemented by using a TV, a PC, or the like which can reproduce the HDR content.

In addition, the sink device 200 may perform an image quality improvement process with respect to the content using the image quality-related data which is received from the source device 100.

Specifically, since the source device 100 transmits the image quality-related data regarding each of the scenes to the sink device 200, the sink device 200 may perform the image quality improvement process with respect to the content on the basis of each scene using the image quality-related data.

Since the image quality-related data includes information about an image when the original content is produced, the sink device 200 may perform the image quality improvement process using the image quality-related data, thereby outputting an image having image quality close to the original image quality. Accordingly, the user may be provided with the content of improved image quality.

Hereinafter, a method of performing an image quality improvement process on the basis of each scene will be explained in detail with reference to the accompanying drawings.

Figure 2A:
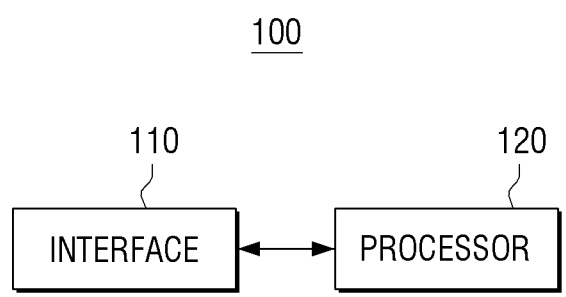
FIGS. 2A and 2B are block diagrams illustrating a configuration of a source device according to an exemplary embodiment.

FIG. 2A is a block diagram illustrating a configuration of a source device according to an exemplary embodiment.

Referring to FIG. 2A, the source device 100 includes an interface 110 and a processor 120.

The interface 110 may communicate with the sink device 200 and transmit the content to the sink device 200. In addition, the interface 110 may transmit the image quality-related data regarding each of the scenes forming the content to the sink device 200. The interface 110 may be an HDMI interface having a number of slots for the pins of an HDMI cable/connector or the like, by way of an example.

For example, the interface 110 may communicate with the sink device 200 in a High Definition Multimedia Interface (HDMI) method through an HDMI connector, and transmit the content and the image quality-related data regarding each of the scenes forming the content to the sink device 200.

However, this is merely an example, and the interface 110 may be connected with the sink device 200 in various methods such as Mobile High Definition Link (MHL), etc.

The processor 120 controls the overall operations of the source device 100. The processor 120 may include a microcom (or a central processing unit (CPU)), and a Random Access Memory (RAM) and a Read Only Memory (ROM) for the operations of the source device 100.

The processor 120 may control the interface 110 to transmit the content reproduced in the source device 100, and the image quality-related data regarding each of the scenes forming the content to the sink device 200.

Specifically, since content producer encodes content and metadata on the content when producing the content, the processor 120 may extract the content and the metadata of the content from the encoded content by decoding the encoded content.

In an exemplary embodiment, the metadata may include the image quality-related data regarding the content. Specifically, the metadata may include the image quality-related data regarding each of the plurality of scenes forming the content.

For example, when a movie content is formed of 100 scenes, the metadata may include image quality-related data regarding the first scene, image quality-related data regarding the second scene, . . . , image quality-related data regarding the $99^{th}$ scene, and image quality-related data regarding the $100^{th}$ scene.

Herein, the image quality-related data is information about images forming the scene, and may include image quality-related information which may be used for the image quality improvement process.

For example, the image quality-related data may include information about at least one of maximum brightness, average brightness, minimum brightness, colorimetry, cadence, sharpness improvement and noise reduction, a motion characteristic, an original resolution, etc. of the images forming the scene.

As described above, according to an exemplary embodiment, the processor 120 may acquire the content and the image quality-related data regarding each of the scenes forming the content, and transmit the content and the image quality-related data regarding each of the scenes forming the content to the sink device 200.

In an exemplary embodiment, the processor 120 may control the interface 110 to transmit, to the sink device 200, image quality-related data regarding the next scene to be output after the scene which is output from the sink device 200 from among the plurality of scenes forming the content, with the content of the scene output from the sink device 200.

Specifically, since the interface 110 includes an HDMI connector and communicates with the sink device 200 in the HDMI method, the processor 120 may form HDMI frames with images and audios forming each of the scenes, and transmit the HDMI frames to the sink device 200 serially through the interface 110. However, according to an exemplary embodiment, the HDMI frame may include one of the image and the audio or may not include the image and the audio.

Accordingly, the sink device 200 may acquire the images and the audios forming the scene from the HDMI frames received from the source device 100, and output the plurality of scenes forming the content serially.

For example, it is assumed that the fourth scene is formed of 1000 image frames, and the fifth scene is formed of 1200 image frames.

In an exemplary embodiment, the processor 120 may serially transmit, to the sink device 200, an HDMI frame including the first image frame from among the image frames forming the fourth scene, and an audio signal, an HDMI frame including the second image frame from among the image frames forming the fourth scene, and an audio signal, . . . , an HDMI frame including the $1000^{th}$ image frame from among the image frames forming the fourth scene, and an audio signal.

Thereafter, the processor 120 may serially transmit, to the sink device 200, an HDMI frame including the first image frame from among the image frames forming the fifth scene, and an audio signal, an HDMI frame including the second image frame from among the image frames forming the fifth scene, and an audio signal, . . . , an HDMI frame including the $1200^{th}$ image frame from among the image frames forming the fifth scene, and an audio signal.

Accordingly, the sink device 200 may acquire the images and the audios from the HDMI frames corresponding to the fourth scene, which are received from the source device 100, and output the images and the audios forming the fourth scene, and may acquire the images and the audios from the HDMI frames corresponding to the fifth scene, which are received from the source device 100, and output the images and the audios forming the fifth scene.

Accordingly, the sink device 200 may output the fourth scene and the fifth scene serially.

Meanwhile, the processor 120 may transmit image quality-related data regarding the next scene to be output after the scene output from the sink device 200, to the sink device 200, along with the content of the scene output from the sink device 200.

That is, the processor 120 may transmit, to the sink device 200, the image quality-related data regarding the next scene of the scene belonging to the images and the audios which are currently transmitted to the sink device 200, along with the images and the audios which are currently transmitted to the sink device 200.

For example, when the source device 100 transmits the images and the audios forming the fifth scene to the sink device 200, the sink device 200 outputs the fifth scene. In an exemplary embodiment, when transmitting the images and the audios forming the fifth scene to the sink device 200, the processor 120 may transmit image quality-related data regarding the sixth scene to the sink device 200.

As described above, the processor 120 may transmit the image quality-related data regarding the next scene to be output after the scene currently output from the sink device 200, to the sink device 200 one scene early.

In an exemplary embodiment, the processor 120 may insert the image quality-related data into a Source Product Description (SPD) Infoframe of the HDMI frame, and transmit the image quality-related data to the sink device 200.

That is, according to the HDMI standard, the source device 100 transmits information about the manufacturer, model name, and product description of the source device 100 to the sink device 200 through the SPD infoframe. However, according to an exemplary embodiment, the source device 100 may transmit the image quality-related data regarding the scene to the sink device 200 through the SPD infoframe instead of the above-described information. However, this is merely an example, and the image quality-related data regarding the scene may be inserted into the other areas in the HDMI frame in addition to the SPD infoframe, and transmitted to the sink device 200.

For example, the processor 120 may insert the image quality-related data regarding the sixth scene into the SPD infoframe of the HDMI frames including the image frames and the audio signals forming the fifth scene, and transmit the image quality-related data to the sink device 200.

Meanwhile, the processor 120 may divide the image quality-related data regarding the next scene to be output, and transmit the image quality-related data to the sink device 200. That is, the image quality-related data may be divided in the source device 100 and transmitted to the sink device 200.

Specifically, the image quality-related data regarding the scene is inserted into the SPD infoframe and transmitted to the sink device 200. However, the amount of image quality-related data which can be transmitted through the SPD infoframe of a single HDMI frame is limited.

Therefore, when the size of the image quality-related data regarding the scene is greater than the amount of data which can be transmitted through the SPD infoframe of a single HDMI frame, the image quality-related data regarding the scene may be divided, and the divided image quality-related data may be inserted into the SPD infoframes of the plurality of HDMI frames and transmitted to the sink device 200.

For example, it is assumed that the size of the image quality-related data which can be transmitted through the SPD infoframe of a single HDMI frame is 18 bytes, and the size of the image quality-related data regarding the sixth scene is 575 bytes.

In an exemplary embodiment, the processor 120 may divide the image quality-related data regarding the sixth scene by 18 bytes, and transmit the image quality-related data regarding the sixth scene, which is divided by 18 bytes, to the sink device 200 serially through the SPD infoframes of the 32 HDMI frames.

In this case, the size of the image quality-related data regarding the sixth scene is 575 bytes and thus, the 575 bytes may be divided such that 575=18*31+17.

That is, the processor 120 may insert the image quality-related data regarding the sixth scene, which is divided by 18 bytes (i.e. 18 bytes of the image quality-related data), into the SPD infoframe of the HDMI frame including the first image frame from among the image frames forming the fifth scene, and the audio signals, insert the image quality-related data regarding the sixth scene, which is divided by 18 bytes, into the SPD infoframe of the HDMI frame including the second image frame from among the image frames forming the fifth scene, and the audio signals, . . . , insert the image quality-related data regarding the sixth scene, which is divided by 18 bytes, into the SPD infoframe of the HDMI frame including the $31^{st}$ image frame from among the image frames forming the fifth scene, and the audio signals, and insert the image quality-related data regarding the sixth scene, which is divided by 17 bytes, into the SPD infoframe of the HDMI frame including the $32^{nd}$ image frame from among the image frames forming the fifth scene, and the audio signals, and transmit the image quality-related data to the sink device 200.

Meanwhile, the processor 120 may transmit a variety of information to the sink device 200 in addition to the image quality-related data regarding the scene.

For example, the processor 120 may transmit, to the sink device 200, at least one of: information about a division of the image quality-related data, information about a time at which the scene transmitted to the sink device 200 is changed, information about the scene transmitted to the sink device 200, and information about the image quality-related data transmitted to the sink device 200.

Herein, in an exemplary embodiment, the information about the division of the image quality-related data may include information about the number of divided image quality-related data and information about the order of divided image quality-related data when the image quality-related data is divided.

Accordingly, when the image quality-related data is divided, the processor 120 may determine how many pieces the image quality-related data is divided into, and determine the order of each of the divided image quality-related data, and transmit corresponding information to the sink device 200.

Meanwhile, when the content producer produces the content, the content producer may additionally insert, into metadata, information about the scenes forming the content, for example, the number of scenes forming the content, the scene number of each of the scenes, and the start point and the end point of each of the scenes, as well as the image quality-related data regarding each of the scenes.

Accordingly, the processor 120 may determine a time at which the scene is changed in the content using the information acquired from the metadata, and transmit information thereon to the sink device 200.

For example, the processor 120 may determine the time at which the scene of the content output from the sink device 200 is changed by determining a time at which the scene belonging to the images and the audios currently transmitted to the sink device 200 ends and the next scene starts, and transmit information about the time at which the scene of the content is changed to the sink device 200.

In addition, the processor 120 may determine the scene which is transmitted to the sink device 200 using the information acquired from the metadata, and transmit information thereon to the sink device 200.

For example, the processor 120 may determine the scene number of a scene that the images and the audios being transmitted to the sink device 200 belong to, and transmit information about the scene number of the corresponding scene to the sink device 200.

Meanwhile, the information about the image quality-related data transmitted to the sink device 200 may be the scene number of a scene matching the image quality-related data.

That is, since the metadata includes the image quality-related data regarding each scene, the processor 120 may determine the scene number of a scene matching the image quality-related data, and transmit information thereon to the sink device 200.

In an exemplary embodiment, the processor 120 may insert other information into the SPD infoframe in addition to the image quality-related information, and transmit the information to the sink device 200.

For example, it is assumed that the image quality-related data regarding the sixth scene is divided into 32 pieces, and is transmitted to the sink device 200 through the SPD infoframe.

In an exemplary embodiment, when transmitting the images and the audios regarding the fifth scene to the sink device 200, the processor 120 may insert the image quality-related data regarding the sixth scene, which is divided into 32 pieces, into the SPD infoframes of the 32 HDMI frames including the image frames and the audio signals of the fifth scene, and transmit the image quality-related data to the sink device 200 serially.

In this case, the processor 120 may insert, into the SPD infoframes of the 32 HDMI frames, information indicating that the image quality-related data regarding the sixth scene is divided into 32 pieces, information about the order of the 32 pieces of the image quality-related data regarding the sixth scene, which are inserted into the SPD infoframes of the HDMI frames, information indicating that the image frames and the audio signals included in the HDMI frames form the fifth scene, and information indicating that the image quality-related data is related to the sixth scene.

To transmit the information about the time at which the scene is changed, the processor 120 may insert the information indicating that the scene is changed into the SPD infoframe of the HDMI frame which is transmitted to the sink device 200 first as the scene is changed.

In the above-described example, the processor 120 may insert the information indicating that the scene is changed into the SPD infoframe of the HDMI frame including the first image frame and the audio signal forming the fifth scene, and transmit the information to the sink device 200.

As described above, when the scene is changed and a new scene is output from the sink device 200, the processor 120 may insert the information indicating that the scene is changed into the SPD infoframe of the HDMI frame which is initially transmitted to the sink device 200, and transmit the information to the sink device 200 in order to output the new scene.

When a scene has a short time to be reproduced, the processor 120 may not have sufficient time to transmit image quality-related data regarding the next scene while transmitting the content of the scene to the sink device 200.

In this case, the processor 120 may not transmit the image quality-related data regarding the next scene or may transmit only a part of the image quality-related data regarding the next scene that can be transmitted to the sink device 200.

For example, the processor 120 may transmit only a part of the image quality-related data regarding the next scene as much as can be transmitted while the content is transmitted to the sink device 200.

Specifically, when the processor 120 can only transmit the information related to maximum brightness of an image from among pieces of information forming the image quality-related data about the next scene through the HDMI frame which is required to transmit images and audios forming a single scene to the sink device 200, the processor 120 may only transmit the information related to the maximum brightness of the image forming the next scene to the sink device 200 along with the images and the audios forming the scene.

In another example, when the sink device 200 performs an image quality improvement process with respect to the content using the image quality-related data, the processor 120 may only transmit the important information to the image quality improvement process; that is, only the information which greatly effects the image quality improvement to the sink device 200 i.e., only the most effective information such as maximum brightness; effectiveness of the information is determined based on a criteria which may be user pre-set or system generated.

Specifically, when the colorimetry of the image has a significant effect on the image quality improvement process from among pieces of information forming the image quality-related data, the processor 120 may transmit only the information on the colorimetry of the image forming the next scene to the sink device 200 along with the images and the audios forming the scene.

In addition, before a scene having a short time to be reproduced is output e.g., a scene that needs to be reproduced quickly and/or a scene that is short, the processor 120 may transmit the image quality-related data regarding the next scene of the scene having the short time to be reproduced to the sink device 200.

For example, it is assumed that the seventh scene has a short time to be reproduced and thus the image quality-related data regarding the eighth scene cannot be transmitted to the sink device 200 while the content forming the seventh scene is transmitted.

According to an exemplary embodiment, the processor 120 may then transmit the image quality-related data regarding the eighth scene to the sink device 200 while transmitting the images and the audios forming the sixth scene to the sink device 200. That is, the processor 120 may transmit the image quality-related data regarding the seventh scene while transmitting the images and the audios forming the sixth scene to the sink device 200, and may transmit the image quality-related data regarding the eighth scene when the image quality-related data regarding the seventh scene is completely transmitted.

When there exists a scene having a short time to be reproduced in the content, the processor 120 may transmit information thereon to the sink device 200.

Specifically, the processor 120 may acquire information about the scenes forming the content from the metadata and determine a reproducing time of each of the scenes, determine the size of the image quality-related data of each of the scenes, and determine whether there is a scene that has a short reproducing time so that the image quality-related data cannot be transmitted.

In addition, when there is a scene which has a short reproducing time, and the processor 120 transmits the previous scene of the scene having the short reproducing time to the sink device 200, the processor 120 may insert information on the number of scenes having the short reproducing time and coming after the corresponding scene into the SPD infoframe, and transmit the information to the sink device 200.

For example, it is assumed that the seventh scene and the eighth scene have a short reproducing time e.g., they are short scenes.

In an exemplary embodiment, since the two continuous scenes after the sixth scene have the short reproducing time, the processor 120 may insert information indicating that there are two scenes having a short reproducing time after the sixth scene into the SPD infoframe of the HDMI frame when transmitting the HDMI frames including the images and the audios forming the sixth scene to the sink device 200, and transmit the information to the sink device 200.

Meanwhile, when the processor 120 transmits all of the image quality-related data regarding the next scene while the sink device 200 outputs the scene, the processor 120 may not transmit the image quality-related data again, and may transmit the information about the manufacturer, model name, and product description of the source device 100 to the sink device 200 through the SPD infoframe according to the HDMI standard, in an exemplary embodiment.

In the above-described example, since the processor 120 transmits all of the image quality-related data regarding the sixth scene to the sink device 200 while transmitting the 32 HDMI frames to the sink device 200, the processor 120 may insert the information about the manufacturer, model name, and product description of the source device 100 into the SPD infoframes of the 33$^{rd}$ HDMI frame to the 1200$^{th}$ HDMI frame, and transmit the information to the sink device 200.

Hereinafter, according to an exemplary embodiment, the SPD infoframe will be explained in detail with reference to FIG. 3.

FIG. 3 is a view illustrating information which is inserted into the SPD infoframe according to an exemplary embodiment.

Referring to FIG. 3, the SPD infoframe is divided into a header and a data region.

First, the header includes a scene transition flag, a null metadata scene, a metadata present, an UHD version, and a metadata packet size.

In an exemplary embodiment, the scene transition flag, the null metadata scene, the metadata present, and the UHD version may be inserted into data byte 1 of the SPD infoframe, and the metadata packet size may be inserted into data byte 2 of the SPD infoframe.

The scene transition flag may be formed of one bit, and includes information about a time at which a scene is changed.

Specifically, as shown in table 1 presented below, according to an exemplary embodiment, in the SPD infoframe of the HDMI frame which is transmitted to the sink device 200 at the time when a scene is changed and a new scene starts, that is, in the SPD infoframe of the HDMI frame including the first image frame of the new scene, the scene transition flag may be set to 1 and indicate that the scene is changed from the corresponding HDMI frame and the new scene starts. In addition, in the SPD infoframes of the other HDMI frames of the corresponding scene, the scene transition flag may be set to 0.

TABLE 1

| | Scene transition flag |
|---|---|
| 0 | No scene transition |
| 1 | Scene transition |

Accordingly, the source device 100 provides the information about the time at which the scene is changed to the sink device 200 through the scene transition flag, and the sink device 200 may determine the time at which the scene is changed using the scene transition flag.

The null metadata scene is formed of at least one bit and includes information about a scene having a short reproducing time.

Specifically, when there is a scene having a short reproducing time after the scene transmitted to the sink device 200, the null metadata scene may include information about the number of scenes having a short reproducing or reproduction time. According to an exemplary embodiment, a reserved bit that exists in the header may be additionally used to provide the information about the scene having the short reproducing time.

For example, when two continuous scenes after the scene transmitted to the sink device 200 have a short reproducing time, the null metadata scene is set to 10 and provides information indicating that the two scenes reproduced after the scene transmitted to the sink device 200 have a short reproducing time to the sink device 200.

The metadata present is formed of one bit and includes information about whether image quality-related data is included in the SPD infoframe or not. That is, the metadata includes information about whether the SPD infoframe carries image quality-related data.

Specifically, when the SPD infoframe of the HDMI frame includes the image quality-related data as shown in table 2 presented below, the metadata present may be set to 1, and, when the SPD infoframe of the HDMI frame does not include image quality-related data, the metadata present may be set to 0.

TABLE 2

| | Metadata present |
|---|---|
| 0 | No metadata |
| 1 | Metadata present |

Accordingly, the source device 100 may provide information about whether the image quality-related data is included in the SPD infoframe or not to the sink device 200 through the metadata present, and the sink device 200 may determine whether the data inserted into the SPD infoframe transmitted from the source device 100 is valid or not as the image quality-related data using the metadata present.

As described above, according to an exemplary embodiment, the metadata present may be used to indicate whether the image quality-related data is included in the SPD infoframe or not.

Accordingly, when all of the image quality-related data regarding the next scene is transmitted while a scene is output from the sink device 200, the metadata present may be set to 0 until the scene output from the sink device 200 is changed to the next scene.

That is, in an exemplary embodiment, since the image quality-related data regarding the next scene is inserted into the HDMI frame which is initially transmitted to the sink device 200 at the time when the scene is changed, and is transmitted to the sink device 200, the image quality-related data is not transmitted to the sink device 200 through the SPD infoframe until all of the image quality-related data regarding the next scene is transmitted and the scene is changed to a new scene. Therefore, the metadata present may be set to a null data value, that is, 0 until all of the image quality-related data regarding the next scene is transmitted and the scene is changed to a new scene.

The UHD version includes information about an UHD version. In an exemplary embodiment, the UHD version may indicate information about the UHD version using 2 bits by way of an example. However, when the UHD version is changed by updating, for example, the reserved bit existing in the header may be used to indicate the information about the UHD version.

The metadata packet size includes information about the number of divided image quality-related data when the image quality-related data is divided.

Specifically, when the image quality-related data is divided, each of the divided image quality-related data forms a packet and is transmitted to the sink device 200. Therefore, the metadata packet size may include information about how many packets are formed by the divided image quality-related data. When the image quality-related data regarding the sixth scene is divided into 32 pieces as in the above-described example, the metadata packet size may be set to 00100000 and indicate that the image quality-related data regarding the sixth scene is divided into 32 pieces.

Accordingly, the source device 100 may provide information about the number of divided image quality-related data to the sink device 200 through the metadata packet size, and the sink device 200 may determine the size of the image quality-related data using the metadata packet size, and determine whether all of the divided image quality-related data is received or not from the source device 100.

The data region includes an UHD metadata byte, a scene number, a metadata scene number, and a metadata divide number.

The UHD metadata byte may be the image quality-related data regarding the scene, that is, the image quality-related data regarding the next scene of the scene transmitted to the sink device 200, and may be inserted into data byte 3 to data byte 20 of the SPD infoframe.

The scene number includes information about the scenes of the content which is transmitted to the sink device 200.

Specifically, the scene number may include information about how many scenes have been transmitted before the current scene is transmitted to the sink device 200, for example, the scene number of the scene transmitted to the sink device 200, and may be inserted into data byte 21.

For example, when the images and the audios included in the HDMI frame which is transmitted to the sink device 200 belong to the fifth scene, the scene number is set to 00000101 and may include information indicating that the images and the audios transmitted to the sink device 200 correspond to the fifth scene. That is, the scene number may include the scene number of the scene to which the images and the audios transmitted to the sink device 200 belong.

Accordingly, the sink device 200 may determine how many scenes have been transmitted before the current scene is transmitted from the source device 100 using the scene number.

The metadata scene number includes information about the image quality-related data which is transmitted to the sink device 200.

Specifically, the metadata scene number may be transmitted to the sink device 200, includes information about which scene the image quality-related data is related to, and may be inserted into data byte 22.

For example, when the image quality-related data included in the SPD infoframe of the HDMI frame transmitted to the sink device 200 is related to the sixth scene, the metadata scene number may be set to 00000110 and include information indicating that the image quality-related data transmitted to the sink device 200 corresponds to the sixth scene. That is, the metadata scene number may include the scene number of the scene related to the image quality-related data which is transmitted to the sink device 200.

Accordingly, the sink device 200 may determine which scene matches the image quality-related data transmitted from the source device 100 using the metadata scene number.

When the image quality-related data is divided, the metadata divide number includes information about the order of the divided image quality-related data. In an exemplary embodiment, the metadata divide number may be inserted into data byte 23.

It is assumed that the image quality-related data regarding the sixth scene is divided into 32 pieces as in the above-described example.

Accordingly, in an exemplary embodiment, the metadata divide number may include information indicating the order of the image quality-related data regarding the sixth scene which is inserted into the SPD infoframe of each of the HDMI frames from among the 32 pieces of data.

For example, the source device 100 may divide the image quality-related data, insert the divided image quality-related data into the SPD infoframes of the HDMI frames serially, and transmit the image quality-related data to the sink device 200.

Accordingly, in an exemplary embodiment, since the second image quality-related data from among the divided image quality-related data regarding the sixth scene is inserted into the SPD infoframe of the HDMI frame which includes the second image frame from among the image frames forming the fifth scene, and the audio signals, the metadata divide number of the SPD infoframe may include the information indicating that the second image quality-related data is inserted into the SPD infoframe.

As such, according to an exemplary embodiment, the sink device 200 may determine the order of the divided image quality-related data using the metadata divide number, and restore the image quality-related data based on the order of the image quality-related data.

Referring back to FIG. 2A, the processor 120 may determine whether the sink device 200 is able to perform the image quality improvement process based on Extended Display Identification Data (EDID) received from the sink device 200. When the sink device 200 is able to perform the image quality improvement process, the processor 120 may transmit the image quality-related data to the sink device 200.

Specifically, when the sink device 200 is connected in the HDMI method, the source device 100 may access the sink device 200 through a DDC communication line, and receive the EDID including information indicating whether the sink device 200 is able to perform the image quality improvement process or not from the sink device 200.

Accordingly, in an exemplary embodiment, the processor 120 may determine whether the sink device 200 is able to perform the image quality improvement process or not using the EDID received from the sink device 200, and, when the sink device 200 is able to perform the image quality improvement process, may transmit the image quality-related data regarding each of the scenes to the sink device 200.

However, when the sink device 200 is not able to perform the image quality improvement process, the processor 120 may not transmit the image quality-related data regarding each of the scenes to the sink device 200. Then, according to an exemplary embodiment, the processor 120 may transmit the information about the manufacturer, model name, and product description of the source device 100 to the sink device 200 through the SPD infoframe as defined in the HDMI standard.

Figure 4B:
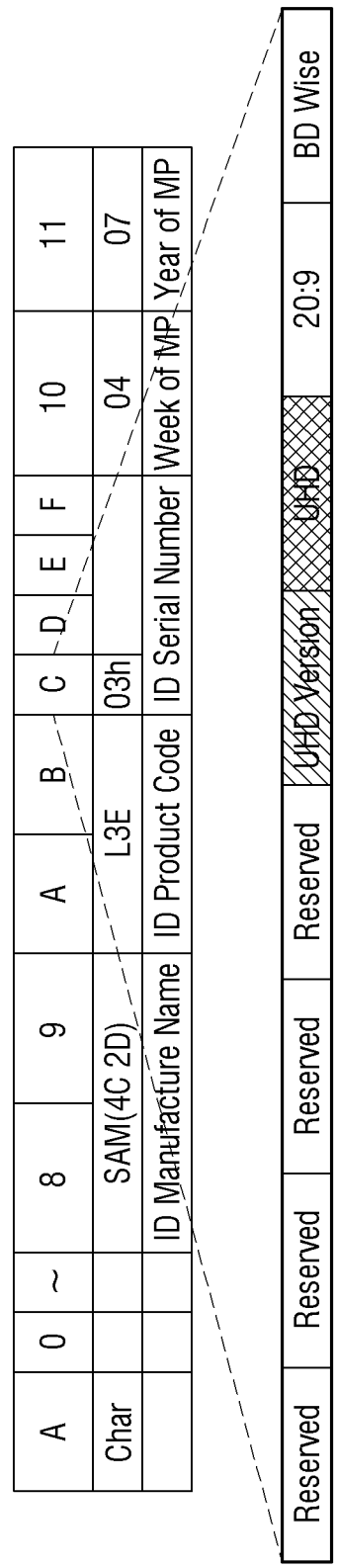

FIGS. 4A and 4B are views illustrating an EDID structure according to an exemplary embodiment.

When the sink device 200 is able to perform the image quality improvement process with respect to an UHD image, the sink device 200 may pre-store the EDID which includes information indicating that it is possible to perform the image quality improvement process with respect to the UHD image, and version information related to the image quality improvement process.

That is, according to an exemplary embodiment, the manufacturer of the sink device 200 may insert, into the EDID, the information related to the image quality improvement process as well as a manufacturer ID indicating the manufacturer, a manufacture ID indicating the model name of a product, and information about the image and audio output standards of the sink device 200, and then store the EDID in a storing medium (for example, an EEPROM) provided in the sink device 200.

For example, as shown in FIGS. 4A and 4B, the information indicating that it is possible to perform the image quality improvement process with respect to the UHD image, and the information on about a version related to the image quality improvement process may be inserted into the [0Ch] ID serial number of the EDID.

Specifically, when the sink device 200 is able to perform the image quality improvement process with respect to the UHD image, the bit included in the UHD of the ID serial number may be 1, and, when the sink device 200 is not able to perform the image quality improvement process with respect to the UHD image, the bit included in the UHD of the ID serial number may be 0.

In addition, the UHD version of the ID serial number may include the version information of an image quality improvement process function on the UHD image, which is performed in the sink device 200.

Meanwhile, when the source device 100 is connected in the HDMI method, the sink device 200 may transmit its own EDID to the source device 100.

Accordingly, the processor 120 may determine whether the sink device 200 is able to perform the image quality improvement process with respect to the UHD image using the information included in the EDID received from the sink device 200, and determine the version information thereon.

In addition, when the sink device 200 is able to perform the image quality improvement process with respect to the UHD image, the processor 120 may insert the image quality-related data into the SPD infoframe of the HDMI frame and transmit the image quality-related data to the sink device 200. However, when the sink device 200 is not able to perform the image quality improvement process with respect to the UHD image, the processor 120 may insert the information about the manufacturer, model name, and product description of the source device 100 into the SPD infoframe of the HDMI frame, and transmit the information to the sink device 200.

Figure 2B:
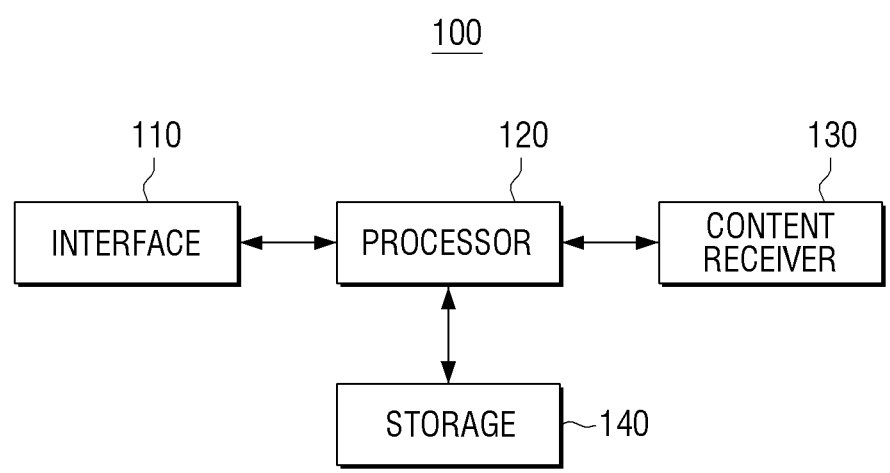

FIG. 2B is a block diagram illustrating a source device in detail according to an exemplary embodiment.

Referring to FIG. 2B, the source device 100 may further include a content receiver 130 and a storage 140 in addition to the interface 110 and the processor 120. The operations of the content receiver 130 and the storage 140 may be controlled by the processor 120. Since the interface 110 and the processor 120 have been described with reference to FIG. 2A, a detailed description thereof will be omitted.

The content receiver 130 may receive content to be transmitted to the sink device 200.

For example, the content receiver 130 may receive content from an optical disk such as a DVD, a Blu-ray disk, etc., or may be connected with an external medium such as a USB, an external hard disk, etc., and receive content therefrom.

In addition, the content receiver 130 may be implemented by using a tuner (not shown) to receive broadcast signals including content from a broadcasting station, or may be connected with the Internet to download content or receive streams of content from an external server (not shown).

The storage 140 stores the content. For example, the storage 140 may be implemented by using various kinds of storage media such as a Read Only Memory (ROM), an Electrically Erasable and Programmable Read Only Memory (EEPROM), a hard disk, or the like, and pre-store the content to be transmitted to the sink device 200.

Accordingly, the processor 120 may transmit the content which is received through the content receiver 130 or the content which is stored in the storage 140 to the sink device 200, and transmit, to the sink device 200, the image quality-related data regarding each of the scenes forming the content, one scene earlier than the scene output from the sink device 200, along with the content.

Figure 5A:
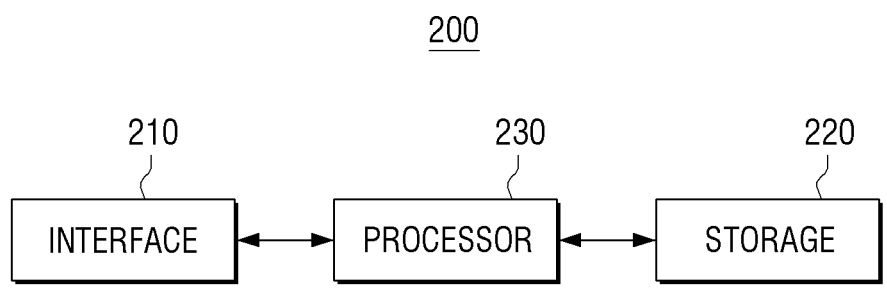
FIGS. 5A and 5B are block diagrams illustrating a configuration of a sink device according to an exemplary embodiment.

FIG. 5A is a block diagram illustrating a configuration of a sink device according to an exemplary embodiment.

Referring to FIG. 5A, the sink device 200 includes an interface 210, a storage 220, and a processor 230.

The interface 210 receives content and image quality-related data regarding each of the scenes forming the content from the source device 100. In particular, the interface 210 may receive image quality-related metadata regarding the next scene to be output after the scene is output from the sink device 200 from among the plurality of scenes forming the content.

To achieve this, according to an exemplary embodiment, the interface 210 may communicate with the source device 100. For example, the interface 210 may communicate with the source device 100 through an HDMI connector in the HDMI method, and receive the content and the image quality-related data regarding each of the scenes forming the content. In an exemplary embodiment, the interface 210 may be an HDMI interface.

However, this is merely an example, and the interface 210 may be connected with the source device 100 in various methods such as a Mobile High Definition Link (MHL).

The storage 220 may store the image quality-related data received from the source device 100. Herein, the image quality-related data may be image quality-related data regarding the next scene to be output after the scene is output from the sink device 200 from among the plurality of scenes forming the content.

In addition, the storage 220 may pre-store EDID.

In an exemplary embodiment, the EDID may include information indicating that it is possible to perform an image quality improvement process with respect to an image when the sink device 200 is able to perform the image quality improvement process with respect to the image, and version information related to the image quality improvement process. That is, the EDID may include information related to the image quality improvement process as well as information about a manufacturer ID indicating a manufacturer, a manufacture ID indicating the model name of a product, and the image and audio output standards of the sink device 200.

To achieve this, according to an exemplary embodiment, the storage 220 may be implemented by using various kinds of storage media such as an ROM, an EEPROM, a hard disk, etc.

The processor 230 may control the overall operations of the sink device 200. The processor 230 may include a mi-com (or a CPU), and an RAM and a ROM for the operations of the sink device 200.

The processor 230 may output the content which is received from the source device 100.

In an exemplary embodiment, the content is formed of a plurality of scenes, and the source device 100 forms HDMI frames with images and audios forming each of the scenes, and transmit the HDMI frames to the sink device 200 serially.

Accordingly, the processor 230 may acquire the images and the audios forming each of the scenes from the HDMI frames received through the interface 210, and output the plurality of scenes forming the content serially through a display (not shown) and an audio outputter (not shown) provided in the sink device 200.

For example, the processor 230 may acquire the images and the audios from the HDMI frame corresponding to the fourth scene, and output the images and the audios forming the fourth scene, and may acquire the images and the audios from the HDMI frame corresponding to the fifth scene and output the images and the audios forming the fifth scene.

Accordingly, the processor 230 may output the fourth scene and the fifth scene serially and/or sequentially.

Meanwhile, the source device 100 may transmit the image quality-related data regarding the next scene to be output after the scene that is output from the sink device 200, to the sink device 200 along with the content of the scene output from the sink device 200.

That is, the source device 100 may transmit the image quality-related data regarding the next scene of the scene to which the images and the audios currently transmitted to the sink device 200 belong to the sink device 200 along with the images and the audios currently transmitted to the sink device 200.

For example, when the source device 100 transmits the images and the audios forming the fifth scene to the sink device 200, the sink device 200 outputs the fifth scene. In an exemplary embodiment, the source device 100 may transmit the image quality-related data regarding the sixth scene to the sink device 200 when transmitting the images and the audios forming the fifth scene to the sink device 200.

Accordingly, the processor 230 may control to store the image quality-related data regarding the next scene to be output after the currently output scene in the storage 220 at the same time of outputting the scene of the content.

That is, the processor 230 may output the images and the audios which are received from the source device 100, and store the image quality-related data received from the source device 100 along with the images and the audios, that is, the image quality-related data regarding the next scene of the scene to which the images and the audios received from the source device 100 belong, in the storage 220.

In the above-described example, the processor 230 may output the images and the audios forming the fifth scene, and store the image quality-related data regarding the sixth scene in the storage 220 while outputting the images and the audios forming the fifth scene.

As described above, according to an exemplary embodiment, the processor 230 may store the image quality-related data regarding the scene to be output one scene later than the scene currently output from the sink device 200. That is, the image quality-related data may be received from the source device 100 one scene earlier than the output from the sink device 200, and stored in the sink device 200.

Meanwhile, the source device 100 may insert the image quality-related data into the SPD infoframe of the HDMI frame, and transmit the image quality-related data to the sink device 200. Accordingly, the processor 230 may acquire the image quality-related data from the SPD infoframe of the HDMI frame. However, this is merely an example, and the image quality-related data regarding the scene may be inserted into the other region in the HDMI frame in addition to the SPD infoframe and transmitted to the sink device 200.

In the above-described example, the source device 100 may insert the image quality-related data regarding the sixth scene into the SPD infoframe of the HDMI frame which includes the images and the audio signals forming the fifth scene, and transmit the image quality-related data to the sink device 200. Accordingly, the processor 230 may acquire the image quality-related data regarding the sixth scene from the HDMI frame regarding the fifth scene, and store the image quality-related data in the storage 220.

In addition, the source device 100 may divide the image quality-related data regarding the next scene to be output, and transmit the image quality-related data to the sink device 200.

That is, the source device 100 may divide the image quality-related data regarding the scene, insert the divided image quality-related data into the SPD frames of the plurality of HDMI frames, and transmit the image quality-related data to the sink device 200.

When the image quality-related data is divided and transmitted as described above, according to an exemplary embodiment, the processor 230 may accumulate the divided image quality-related data and generate the original image quality-related data which is the same as before the image quality-related data is divided, and store the image quality-related data in the storage 220.

As in the above-described example, it is assumed that the source device 100 divides the image quality-related data regarding the sixth scene into 32 pieces, and transmits the image quality-related data to the sink device 200 serially through the SPD infoframes of the 32 HDMI frames.

In an exemplary embodiment, the processor 230 may acquire the divided image quality-related data regarding the sixth scene from the respective SPD infoframes of the 32 HDMI frames, accumulate the image quality-related data, and generate the original image quality-related data regarding the sixth scene, which is the same as before the image quality-related data is divided.

In an exemplary embodiment, the processor 230 may accumulate the image quality-related data acquired from the respective HDMI frames according to the order of the received HDMI frames.

That is, the processor 230 may generate the original image quality-related data regarding the sixth scene, which is the same as before the image quality-related data is divided, by accumulating the image quality-related data which is acquired from the SPD infofram of the HDMI frame including the first image frame from among the image frames forming the scene, and the audio signals, the image quality-related data which is acquired from the SPD infofram of the HDMI frame including the second image frame from among the image frames forming the scene, and the audio signals, . . . , and the image quality-related data which is acquired from the SPD infofram of the HDMI frame including the 32$^{nd}$ image frame from among the image frames forming the scene, and the audio signals, in sequence.

Meanwhile, the processor 230 may perform the image quality improvement process with respect to the next scene to be reproduced using the stored image quality-related data.

That is, since the storage 220 stores the information about the next scene to be output after the currently output scene, rather than the information about the scene currently being output from the sink device 200, the processor 230 may perform the image quality improvement process with respect to the images forming the next scene using the image quality-related data stored in the storage 220 when the output of the current scene is completed and the next scene is output, and may output the images having the improved image quality.

For example, the processor 230 may perform the image quality improvement process with respect to the images forming the next scene using information about maximum brightness of the images included in the image quality-related data.

For example, it is assumed that the maximum brightness of the images included in the image quality-related data is 2000 nits (nit: brightness per square meter (cd/m$^2$)), and the maximum brightness that can be output by the sink device 200 is 1000 nits. Herein, the maximum brightness of the images included in the image quality-related data refers to the maximum brightness of the images forming the next scene with respect to the scene currently output from the sink device 200, and may be stored in the storage 220.

In an exemplary embodiment, the processor 230 may adjust the brightness of the images forming the next scene based on the maximum brightness which can be output by the sink device 200, and the maximum brightness of the images forming the next scene.

Specifically, in an exemplary embodiment, since the maximum brightness of the images included in the image quality-related data is 2000 nits, and the maximum brightness which can be output by the sink device 200 is 1000 nits, the processor 230 may reduce the brightness of the image frames forming the next scene by 50%, and output the images regarding the next scene.

In another example, according to an exemplary embodiment, the processor 230 may perform the image quality improvement process with respect to the images forming the next scene using information about colorimetry included in the image quality-related data. Herein, the information about the colorimetry included in the image quality-related data is colorimetry information about the images forming the next scene of the scene currently output from the sink device 200, and may be stored in the storage 220.

Specifically, the processor 230 may change R, G, and B color coordinate values of the sink device 200 to match reference values of R, G, and B color coordinates with reference to the reference values of the R, G, and B color coordinates included in the colorimetry information, and may perform color remapping with respect to the colors of the images forming the next scene.

As described above, according to an exemplary embodiment, the processor 230 may perform the image quality improvement process with respect to the images forming the next scene using the image quality-related data which is transmitted one scene early and stored in the storage 220, when the scene currently output from the sink device 200 ends and the next scene is output, and the images regarding the next scene are output with an improved image quality.

The above-described image quality improvement processing method is merely an example for the convenience of an explanation. That is, the processor 230 may perform the image quality improvement process using a variety of information included in the image quality-related data through various technologies in addition to the above-described method, provided by way of an example and not by way of a limitation.

According to an exemplary embodiment, when the image quality-related data stored in the storage 220 is used for the image quality improvement process, the processor 230 may delete the image quality-related data stored in the storage 220.

In addition, when the images with the improved image quality, are outputted, the processor 230 may store the image quality-related data received from the source device 100 in the storage 220, and may perform the image quality improvement process with respect to the next scene of the scene with the images having an improved image quality of, which has been improved using the image quality-related data.

For example, the source device 100 may transmit the images and the audios forming the fifth scene to the sink device 200 along with the image quality-related data regarding the sixth scene, and, when the transmission of the images and the audios forming the fifth scene is completed, may transmit the images and the audios forming the sixth scene to the sink device 200 along with the image quality-related data regarding the seventh scene.

In an exemplary embodiment, when outputting the fifth scene, the processor 230 may perform the image quality improvement process with respect to the fifth scene using the image quality-related data regarding the fifth scene, which is stored in the storage 220 while the fourth scene is output, and may output the fifth scene having the improved image quality.

In an exemplary embodiment, the processor 230 may delete the image quality-related data regarding the fifth scene which is stored in the storage 220, and may store the image quality-related data regarding the sixth scene, which is received along with the images and the audio forming the fifth scene, in the storage 220.

Thereafter, when outputting the sixth scene, the processor 230 may perform the image quality improvement process with respect to the sixth scene using the image quality-related data regarding the sixth scene, which is stored in the storage 220, and may output the sixth scene having the improved image quality.

In an exemplary embodiment, the processor 230 may delete the image quality-related data regarding the sixth scene which is stored in the storage 220, and may store the image quality-related data regarding the seventh scene, which is received along with the images and the audio forming the sixth scene, in the storage 220.

Since the processor 230 deletes the image quality-related data which has been used for the image quality improvement process, and stores newly received image quality-related data as described above, the processor 230 can continuously perform the image quality improvement process with respect to all of the scenes forming the content even when there is no sufficient storage space in the storage 220, according to an exemplary embodiment.

Meanwhile, the processor 230 may use a variety of information received from the source device 100 in performing the image quality improvement process.

First, the processor 230 may determine the number of divided image quality-related data and the order of the divided image quality-related data based on the information received from the source device 100, and may restore the original image quality-related data which is the same as before the image quality-related data is divided.

Specifically, when the source device 100 divides the image quality-related data and transmits the same, the source device 100 may transmit information about how many pieces the image quality-related data is divided into to the sink device 200 through the metadata packet size of the SPD infoframe, and transmit information about the order of the divided image quality-related data to the sink device 200 through the metadata divide number of the SPD infoframe.

Accordingly, the processor 230 may determine whether all of the divided image quality-related data is received from the source device 100 or not using information acquired through the metadata packet size, and determine the order of the divided image quality-related data using information acquired through the metadata divide number, and generate the original image quality-related data which is the same as before the image quality-related data is divided by accumulating the divided image quality-related data according to the determined order.

In addition, the processor 230 may determine a time at which the scene is changed based on information received from the source device 100, and may perform the image quality improvement process with respect to the next scene using the stored image quality-related data when reproducing the next scene.

That is, the source device 100 may transmit information about the time at which the scene is changed to the sink device 200 through the scene transition flag of the SPD infoframe.

Accordingly, the processor 230 may determine the time at which the scene is changed with reference to the scene transition flag, and perform the image quality improvement process with respect to images forming the corresponding scene using the pre-stored image quality-related data when the scene is changed and a new scene is output.

Specifically, when the scene is changed and a new scene starts, the source device 100 may set the scene transition flag in the HDMI frame transmitted to the sink device 200, that is, in the SPD infoframe of the HDMI frame including the first image frame of the new scene, to 1, and set the scene transition flag in the SPD infoframes of the other HDMI frames of the corresponding scene to 0, and transmit the HDMI frames to the sink device 200.

Accordingly, the processor 230 may determine that the new scene starts from the HDMI frame in which the scene transition flag is set to 1 bit, and may perform the image quality improvement process using the image quality-related data stored in the storage 220 when outputting the images included in the HDMI frame.

That is, since the image quality-related data stored in the storage 220 is data which has been already transmitted and stored, and concerns the next scene to be output, the processor 230 may perform the image quality improvement process with respect to the new scene using the image quality-related data stored in the storage 220.

In addition, since the processor 230 determines that the scene is changed using the scene transition flag, the processor 230 may determine that the image quality-related data included in the SPD infoframes of the HDMI frames including the HDMI frame in which the scene transition flag is set to 1 bit, and the HDMI frames which have been received until the next HDMI frame in which the scene transition flag is set to 1 bit is received again is the image quality-related data regarding the next scene.

That is, the processor 230 may determine that the image quality-related data received from the HDMI frame in which the scene transition flag is set to 1 bit until the next HDMI frame in which the scene transition flag is set to 1 bit is received again is image quality-related data regarding images included in the HDMI frame which is received after the HDMI frame in which the scene transition flag is set to 1 bit is received again.

Meanwhile, the processor 230 may determine the number of the next scene to be output based on the information received from the source device 100, and may determine whether the image quality-related data is applicable to the next scene to be output based on the scene number of a scene to which the image quality-related data stored in the storage 220 is applied.

Specifically, the source device 100 may transmit information, to the sink device 200, indicating how many scenes have been transmitted before the current scene is transmitted to the sink device 200, through the scene number of the SPD infoframe, and transmit information indicating which scene is related to the image quality-related data transmitted to the sink device 200 to the sink device 200 through the metadata scene number of the SPD infoframe.

Accordingly, the processor 230 may determine the scene number of the scene which is transmitted to the sink device 200, that is, the scene number of the scene which is currently output from the sink device 200, using information acquired through the scene number, and may determine the scene number of the next scene to be output. In addition, the processor 230 may determine the scene number of the scene related to the image quality-related data which is transmitted to the sink device 200 using information acquired through the metadata scene number.

Accordingly, the processor 230 may compare the scene numbers and determine whether the image quality-related data transmitted to the sink device 200 is applicable to the next scene to be output.

Meanwhile, the processor 230 may use information received from the source device 100 for the image quality improvement process in addition to the above-described information, according to an exemplary embodiment.

For example, the processor 230 may determine whether data inserted into the SPD infoframe, which is transmitted from the source device 100, is image quality-related data or not using "the metadata present" included in the SPD infoframe.

In another example, according to an exemplary embodiment, the processor 230 may determine whether there is a scene having a short reproducing time after the scene transmitted from the source device 100, and the number of scenes having a short reproducing or reproduction time using the null metadata scene included in the SPD infoframe.

When a scene has a short reproducing or reproduction time, the source device 100 may not transmit image quality-related data regarding the next scene of the scene having the short reproducing time, or may transmit only a part of the image quality-related data regarding the next scene as much as can be transmitted to the sink device 200.

Accordingly, when it is determined that there is a scene having a short reproducing time based on the null metadata scene, the processor 230 may not perform the image quality improvement process with respect to the next scene of the scene having the short reproducing time, or may perform the image quality improvement process with respect to the next scene of the scene having the short reproducing time using only a part of the data e.g., only partially improve the image quality of the short scene.

In addition, when the scene has a short reproducing time, the source device 100 may transmit the image quality-related data regarding the next scene of the scene having the short reproducing time to the sink device 200 before the scene having the short reproducing time is output.

In this case, when it is determined that there is the scene having the short reproducing time based on the null metadata scene, the processor 230 may store the received image quality-related data in the storage 220 prior to outputting the scene having the short reproducing time, and perform the image quality improvement process with respect to the next scene of the scene having the short reproducing time using the image quality-related data stored in the storage 220.

For example, when the seventh scene has a short reproducing time, and thus the image quality-related data regarding the eighth scene cannot be transmitted to the sink device 200 while the content of the seventh scene is being transmitted, the source device 100 may transmit the image quality-related data regarding the seventh scene and the image quality-related data regarding the eighth scene to the sink device 200 while transmitting the content of the sixth scene to the sink device 200.

In an exemplary embodiment, the processor 230 may store the image quality-related data regarding the seventh scene and the image quality-related data regarding the eighth scene in the storage 230 while outputting the sixth scene, and perform the image quality improvement process with respect to the seventh scene and the eighth scene in sequence using the image quality-related data.

Figure 5B:
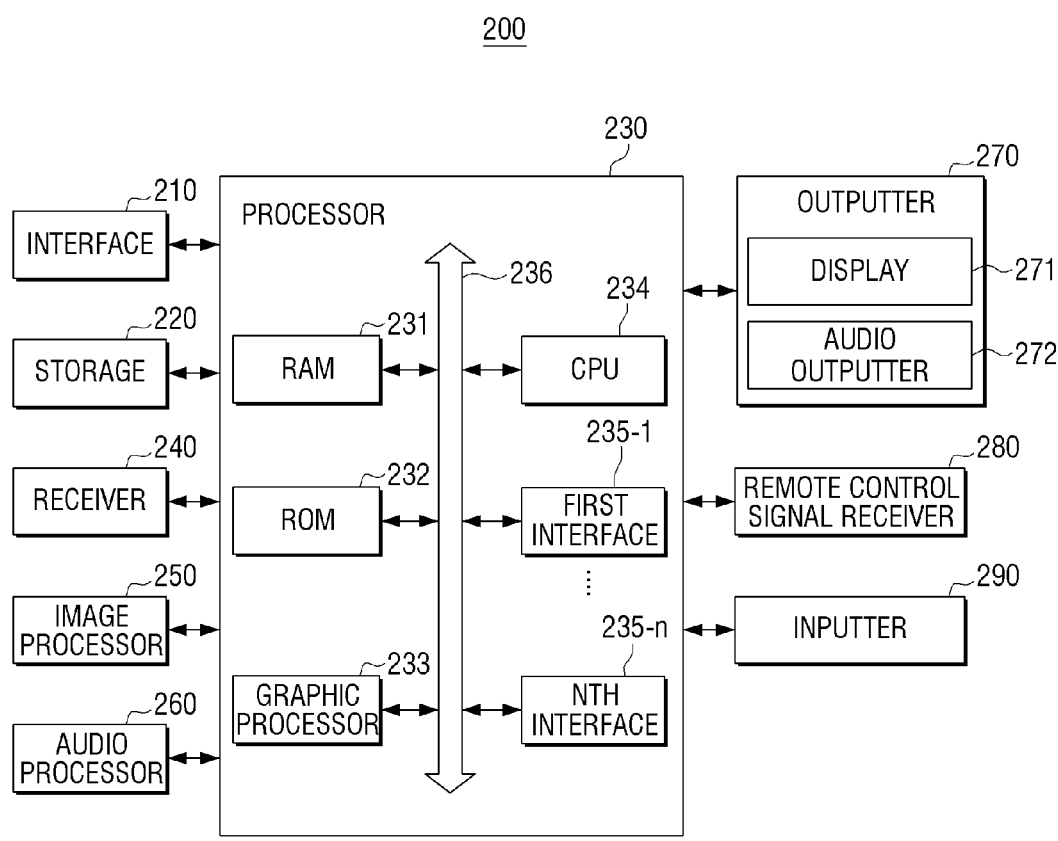

FIG. 5B is a block diagram illustrating a sink device in detail according to an exemplary embodiment.

Referring to FIG. 5B, the sink device 200 may further include a receiver 240, an image processor 250, an audio processor 260, an outputter 270, a remote control signal receiver 280, and an inputter 290, in addition to the interface 210, the storage 220, and the processor 230. The operations of these elements may be controlled by the processor 230. Since the interface 210, the storage 220, and the processor 230 have been described above with reference to FIG. 5A, a detailed description thereof will be omitted.

The receiver 240 may receive a broadcast content. The broadcast content may include an image, an audio, and additional data (for example, Electronic Program Guide (EPG)), and the receiver 240 may receive the broadcast content from various sources such as terrestrial broadcasting, cable broadcasting, satellite broadcasting, Internet broadcasting, etc.

For example, the receiver 240 may be implemented to include a tuner (not shown), a demodulator (not shown), an equalizer (not shown), etc. to receive a broadcast content transmitted from a broadcasting station.

The image processor 250 may process image data forming the content which is received through the interface 210 and the receiver 240. For example, the image processor 250 may perform various image processing operations, such as decoding, scaling, noise filtering, frame rate conversion, resolution conversion, etc. with respect to the image data. The image data processed in the image processor 250 may be output to a display 271.

The audio processor 260 may process audio data forming the content which is received through the interface 210 and the receiver 240. For example, the audio processor 260 may perform various processing operations such as amplification, noise filtering, etc., with respect to the audio data. The audio data processed in the audio processor 260 may be output to an audio outputter 272.

The outputter 270 outputs the content. To achieve this, according to an exemplary embodiment, the outputter 270 may include the display 271 and the audio outputter 272.

The display 271 displays images forming the content. Specifically, the display 271 may output image data which is processed in the image processor 250. In addition, the display 271 may display various screens which are generated in a graphic processor 234.

To achieve this, the display 271 may be implemented by using a Liquid Crystal Display (LCD), an Organic Light Emitting Display (OLED), etc.

The display 271 may further include additional elements according to its implementing method. For example, when the display 271 employs a liquid crystal method, the display 271 may further include an LCD display panel, a backlight unit to supply light to the LCD display panel, a panel driving substrate to drive the panel, etc.

The audio outputter 272 outputs audios forming the content. Specifically, the audio outputter 272 may output the audio data which is processed in the audio processor 260. In addition, the audio outputter 272 may output various notification sounds or voice message as well as the audio data.

To achieve this, according to an exemplary embodiment, the audio outputter 272 may be implemented by using a speaker. However, this is merely an example and not by way of a limitation, and the audio outputter 272 may be implemented by using any output terminal which can output audio data.

The remote control signal receiver 280 may receive a remote control signal input from a remote controller (not shown). For example, the remote control signal receiver 280 may receive remote control signals corresponding to various user commands to control the operation of the sink device 200, and the processor 230 may perform a function corresponding to the received remote control signal.

The inputter 290 may receive various user commands. The processor 230 may perform a function corresponding to the user command input through the inputter 290. To achieve this, according to an exemplary embodiment, the inputter 290 may be implemented by using an input panel. The input panel may implemented by using a touch pad, a key pad provided with various function keys, number keys, special keys, character keys, etc., or a touch screen.

As shown in FIG. 5B, the processor 230 may include a Random Access Memory (RAM) 231, a Read Only Memory (ROM) 232, a graphic processor 233, a Central Processing Unit (CPU) 234, first to n-th interfaces 235-1 to 235-n, and a bus 236. The RAM 231, the ROM 232, the graphic processor 233, the main CPU 234, and the first to n-th interfaces 235-1 to 235-n may be connected with one another via the bus 236.

The ROM 232 may store a set of instructions for booting a system. In response to a turn on command being input and power being supplied, the CPU 234 may copy an O/S stored in the storage 220 into the RAM 231 according to a command stored in the ROM 232, and boot the system by executing the O/S. In response to the booting being completed, the CPU 234 may copy various application programs stored in the storage 220 into the RAM 231, and perform various operations by executing the application programs copied into the RAM 231.

The graphic processor 233 may generate a screen including various objects such as an icon, an image, a text, etc. using a calculator (not shown) and a renderer (not shown). The calculator (not shown) may calculate attribute values of objects to be displayed according to a layout of the screen, such as a coordinate value, a shape, a size, a color, etc. The renderer may generate the screen of various layouts including objects based on the attribute values calculated by the calculator. The screen generated in the renderer is displayed within a display area of the display 271.

The CPU 234 may access the storage 220 and perform booting using the O/S stored in the storage 220. In addition, the main CPU 234 may perform various operations using various programs, content, data, etc. which are stored in the storage 220.

The first to n-th interfaces 235-1 to 235-n may be connected with the above-described various elements. One of the interfaces may be a network interface which is connected with an external device via a network.

Meanwhile, in the above-described example, the source device 100 transmits the image quality-related data regarding the next scene to the sink device 200 from the start of the scene. That is, the source device 100 may insert the image quality-related data regarding the next scene into the SPD infoframe of the HDMI frame including the first image frame from among the image frames forming the scene, and transmit the image quality-related data to the sink device 200.

However, this is merely an example and not by way of a limitation. The source device 100 may transmit the image quality-related data regarding the next scene to the sink device 200 at a certain time in the middle of transmitting the scene to the sink device 200.

For example, the source device 100 may transmit the HDMI frames including only the images and the audios forming the fifth scene to the sink device 200, and may initially insert the image quality-related data regarding the sixth scene at the time of transmitting the HDMI frames including the $22^{nd}$ image frame, and transmit the image quality-related data to the sink device 200.

In addition, in the above-described example, the source device 100 transmits the image quality-related data to the sink device 200 through the SPD infoframe.

However, this is merely an example and not by way of a limitation, and the source device 100 may transmit the image quality-related data to the sink device 200 through various communication channels in addition to the SPD infoframe.

For example, the source device 100 may transmit the image quality-related data to the sink device 200 through a communication channel supported in the HDMI method, for example, an HDMI Ethernet channel (HEC), Consumer Electronic Control (CEC), SCDC, etc.

Figure 6:
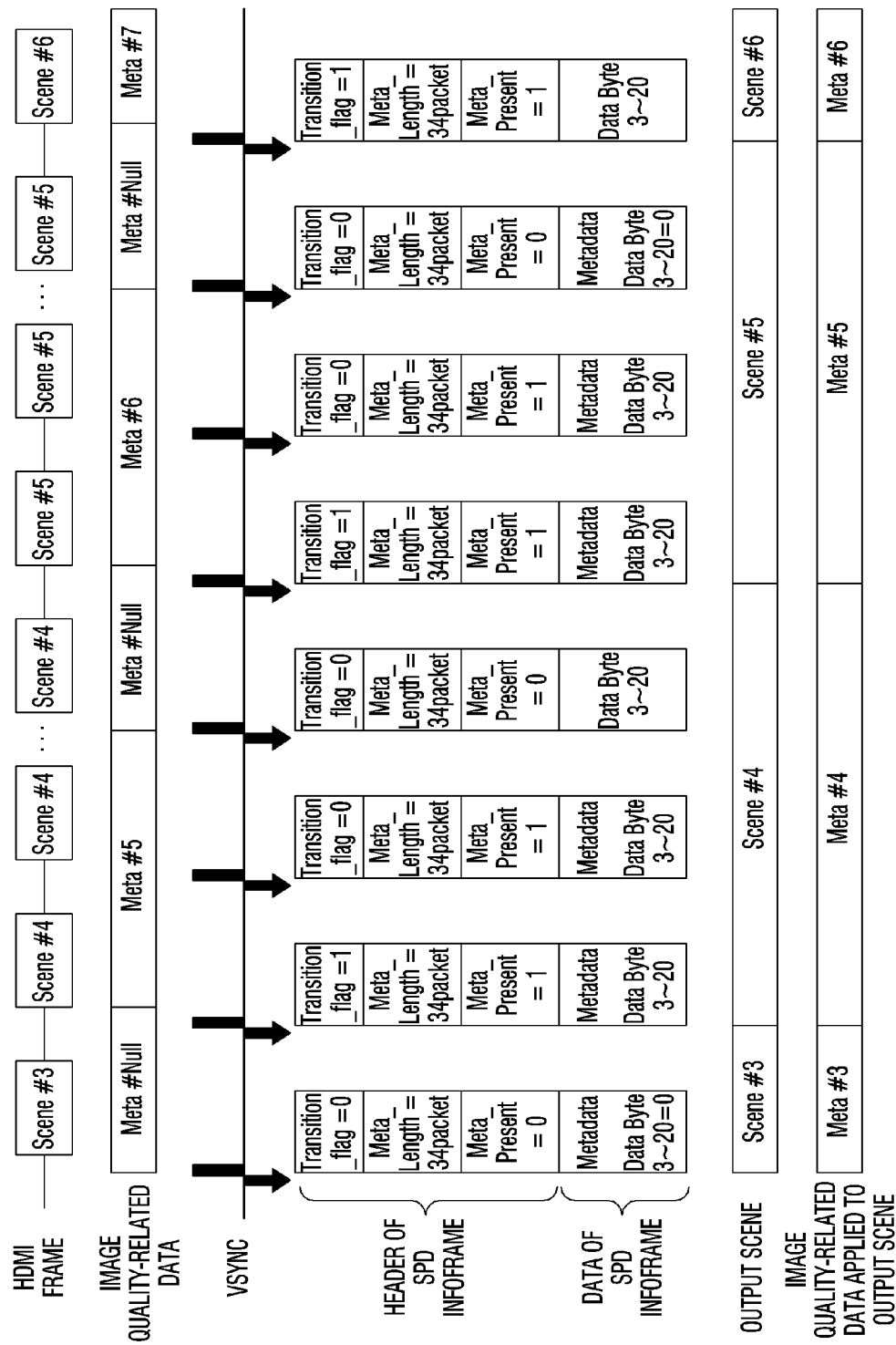
FIG. 6 is a view illustrating a method of performing an image quality improvement process according to an exemplary embodiment.

FIG. 6 is a view illustrating a method of performing an image quality improvement process according to an exemplary embodiment.

FIG. 6 illustrates operations of the source device 100 and the sink device 200 which are performed while the third scene (scene #3) to the sixth scene (scene #6) are output from among the plurality of scenes forming content, and illustrate metadata as image quality-related data used for the image quality improvement process. This is provided by way of an example only and not by way of a limitation.

When the transmission of HDMI frames forming scene #3 is completed, the source device 100 transmits HDMI frames forming scene #4 to the sink device 200. Herein, the HDMI frames forming scene #4 refer to HDMI frames which include audio signals from among the image frames forming scene #4.

In an exemplary embodiment, the source device 100 may insert the image quality-related data (meta #5) regarding scene #5 which is the next scene of scene #4 into data bytes 3-20 of the infoframe, and transmit the image quality-related data to the sink device 200.

In addition, when the scene transmitted to the sink device 200 changes from scene #3 to scene #4, the source device 100 may set transition_flag (=scene transition flag) of the infoframe to 1 and transmit the infoframe to the sink device 200.

In an exemplary embodiment, the source device 100 may set only transition_flag of the HDMI frames transmitted to the sink device 200 when scene #3 is changed to scene #4 to 1, and set transition_flag of the other HDMI frames forming scene #4 to 0. That is, the source device 100 may set only transition_flag of the first HDMI frame from among the HDMI frames of scene #4 (that is, the HDMI frame including the first image frames from among the image frames forming scene #4) to 1.

In addition, when the image quality-related data (meta #5) regarding scene #5 is divided, the source device 100 may insert information about the number of packets forming the image quality-related data of scene #5 (that is, 34 packet) into meta_length (=metadata packet size) of the infoframe, and transmit the infoframe to the sink device 200.

In addition, the source device 100 may set meta_present (=metadata present) of the infoframe to 1 to indicate that the image quality-related data is included in the infoframe, and transmit the infoframe to the sink device 200.

When the transmission of all of the image quality-related data (meta #5) regarding scene #5 is completed, the source device 100 does not transmit the image quality-related data (meta #5) regarding scene #5 anymore (that is, meta #Null). In an exemplary embodiment, the source device 100 may insert information about the source device 100 into data bytes 3-20 of the infoframe according to the HDMI standard, and transmit the information to the sink device 200.

When the image quality-related data (meta #5) regarding scene #5 is not transmitted through the infoframe as described above, according to an exemplary embodiment, the source device 100 may set meta_present to 0 and transmit the infoframe to the sink device 200.

Meanwhile, the sink device 200 may acquire the images and the audios from the HDMI frames received from the source device 100, and output scene #4.

In an exemplary embodiment, the sink device 200 may determine that the scene is changed based on 1 bit which is included in transition_flag of the first HDMI frame from among the HDMI frames forming scene #4, and may perform the image quality improvement process with respect to the images forming scene #4 prior to outputting scene #4 and output scene #4 having improved image quality.

In an exemplary embodiment, the sink device 200 may perform the image quality improvement process with respect to the images forming scene #4 using the image quality-related data (meta #4) regarding scene #4, which is stored while scene #3 is output.

In addition, the sink device 200 may determine that the image quality-related data is included in the infoframe in which meta_present is set to 1, and determine that the image quality-related data included in the infoframe is divided into 34 pieces through meta_length.

Accordingly, in an exemplary embodiment, the sink device 200 may acquire the image quality-related data regarding scene #5 from the infoframe of the 34 HDMI frames in which meta_present is set to 1, and store the image quality-related data regarding scene #5.

Meanwhile, since the source device 100 and the sink device 200 use the above-described method regarding the other scenes, according to an exemplary embodiment, a detailed description regarding the other scenes will be omitted.

As described above, according to an exemplary embodiment, since the source device 100 transmits the image quality-related data to the sink device 200 one scene early or one scene before the scene is reproduced, the sink device 200 may store the image quality-related data received one scene before, and perform the image quality improvement process with respect to a corresponding scene using the image quality-related data prior to outputting the scene.

Figure 7:
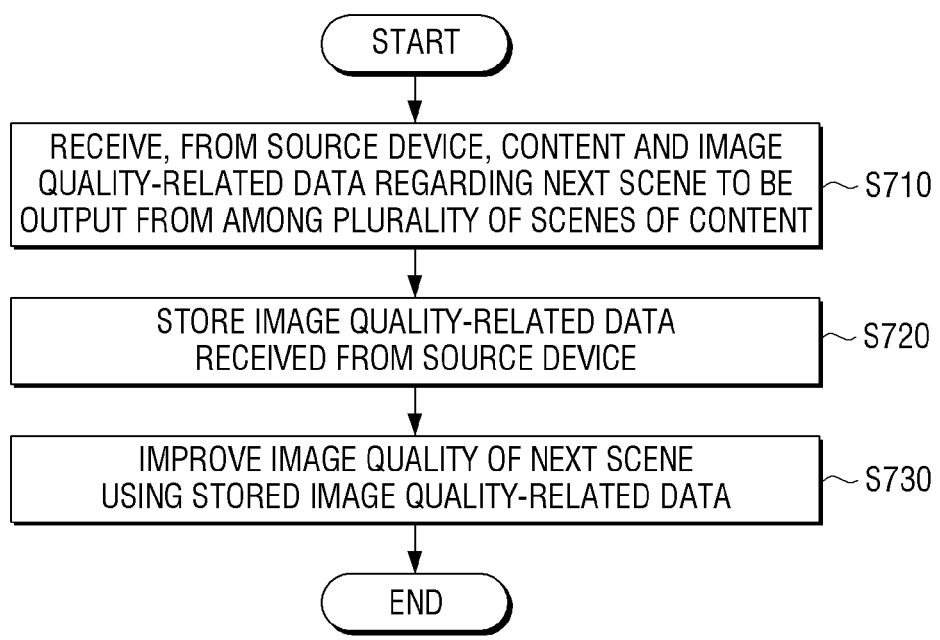
FIG. 7 is a flowchart illustrating an image quality improvement processing method of a sink device according to an exemplary embodiment.

FIG. 7 is a flowchart illustrating an image quality improvement processing method of a sink device according to an exemplary embodiment.

First, the sink device receives, from the source device, content, and image quality-related data regarding the next scene to be output from among a plurality of scenes forming the content (in operation S710). That is, in an exemplary embodiment, the image quality-related data for the next scene is received while a current scene is being output. The image quality-related data received from the source device is stored (in operation S720).

Thereafter, the sink device performs an image quality improvement process regarding the next scene to be output using the stored image quality-related data (in operation S730).

In an exemplary embodiment, the sink device may be connected with the source device through an HDMI, and the image quality-related data may be included in SPD infoframes and transmitted to the sink device.

In addition, the image quality-related data may be divided in the source device and transmitted to the sink device.

In an exemplary embodiment, the sink device may determine the number of the divided image quality-related data and the order of the divided image quality-related data based on information received from the source device, and may restore the original image quality-related data which is the same as before the image quality-related data is divided.

In operation S730, the sink device may determine a time at which the scene is changed based on the information received from the source device, and may perform the image quality improvement process with respect to the next scene using the stored image quality-related data when outputting the next scene.

In the image quality improvement processing method according to one or more exemplary embodiments, the sink device may determine the scene number of the next scene to be output based on the information received from the source device, and determine whether the stored image quality-related data is applicable to the next scene to be output based on the scene number of a scene to which the image quality-related data is applied.

The method for processing the image quality-related data to perform the image quality improvement process with respect to the images forming the scene, and the method for performing the image quality improvement process using the image quality-related data, according to one or more exemplary embodiments, have been described with reference to FIGS. 1 to 6.

Figure 8:
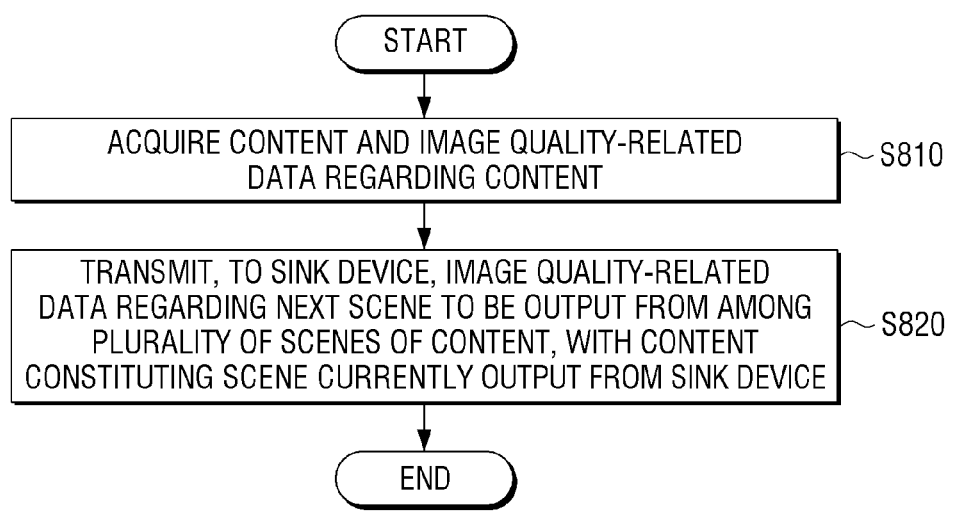
FIG. 8 is a flowchart illustrating a control method of a source device according to an exemplary embodiment.

FIG. 8 is a flowchart illustrating a control method of a source device according to an exemplary embodiment.

The source device acquires or obtains content and image quality-related data regarding the content (in operation S810).

For example, the content may be pre-stored in the source device or the source device may acquire or obtain the content from an external medium such as a DVD, a Blu-ray disk, a USB, an external hard disk, etc.

In another example, the source device may acquire a content from a broadcast signal provided by a broadcasting station, or may download a content or receive streams of content from an external server (not shown) through the Internet.

In an exemplary embodiment, since the content producer provides the content and the metadata of the content in an encoded format, the source device may acquire or obtain the content and the metadata of the content by decoding the encoded content data, and the metadata may include the image quality-related data regarding the content.

However, this is merely an example and not a limitation, and the source device may acquire the content and the image quality-related data thereon in various methods.

Thereafter, the source device may transmit, to the sink device, image quality-related data regarding the next scene to be output from among the plurality of scenes forming the content, along with the content of the scene currently being output from the sink device (in operation S820).

In an exemplary embodiment, the source device may divide the image quality-related data regarding the next scene to be output, and transmit the image quality-related data to the sink device.

In the control method according to exemplary embodiments, the source device may transmit to the sink device at least one of information about division of the image quality-related data, information about a time at which the scene transmitted to the sink device is changed, information about the scene transmitted to the sink device, and information about the image quality-related data transmitted to the sink device.

In addition, in operation S820, the source device may determine whether the sink device is able to perform an image quality improvement process or not based on EDID received from the sink device, and, when the sink device is able to perform the image quality improvement process, transmit the image quality-related data to the sink device. In response to determining that the sink device is not able to perform the image quality improvement process, the transmission of the image quality-related data to the sink device may be omitted.

A method of processing the image quality-related data to perform the image quality improvement process with respect to the images forming the scene, and the method of performing the image quality improvement process using the image quality-related data have been described with reference to FIGS. 1 to 6 according to one or more exemplary embodiments.

A control method and an image quality improvement processing method according to the above-described various exemplary embodiments may be implemented as a program and provided to the source device 100 and the sink device 200. Specifically, a non-transitory computer readable medium which stores a program including the control method of the source device 100 and the image quality improvement processing method of the sink device 200 may be provided.

The non-transitory computer readable medium refers to a medium that stores data semi-permanently rather than storing data for a very short time, such as a register, a cache, a memory or etc., and is readable by an apparatus. Specifically, the above-described programs may be stored in the non-transitory computer readable medium such as a compact disc (CD), a digital versatile disk (DVD), a hard disk, a Blu-ray disk, a universal serial bus (USB), a memory card, a ROM or etc., and may be provided. In addition, the above-described programs may be stored in the storage 140 of the source device 100 and the storage 220 of the sink device 200 as examples of the non-transitory computer readable medium, and provided.

The foregoing exemplary embodiments are merely exemplary and are not to be construed as limiting the present disclosure. The present disclosure can be readily applied to other types of apparatuses. Also, the description of exemplary embodiments are intended to be illustrative, and not to limit the scope of the claims and their equivalents, and many alternatives, modifications, and variations will be apparent to those skilled in the art.

What is claimed is:

1. A sink device comprising:
   an interface configured to receive, from a source device, content and image quality-related data such that a scene, from among a plurality of scenes forming the content, is received with the image quality-related data regarding a next scene to be output after the scene;
   a storage configured to store the image quality-related data received by the interface; and
   a processor configured to perform an image quality improvement process with respect to the next scene to be output using the image quality-related data stored in the storage.

2. The sink device of claim 1, wherein the image quality-related data is received, from the source device, by the interface in a divided form.

3. The sink device of claim 2, wherein the processor is further configured to:
   determine a number of the divided image quality-related data and an order of the divided image quality-related data based on information received from the source device, and
   restore the divided image quality-related data to original image quality-related data which is the same as before the image quality-related data is divided.

4. The sink device of claim 1, further comprising:
   a display outputting the content;
   wherein the processor is further configured to:
   determine a time at which a scene is changed based on information received from the source device, and
   perform the image quality improvement process with respect to the next scene using the image quality-related data stored by the storage during outputting of the next scene by the display.

5. The sink device of claim 1, wherein the processor is further configured to:
   determine a scene number of the next scene to be output based on information received from the source device, and
   determine whether the stored image quality-related data is applicable to the next scene to be output based on the scene number determined by the processor.

6. The sink device of claim 1, wherein the interface is connected with the source device through a High-Definition Multimedia Interface (HDMI), and
   wherein the image quality-related data is received by the interface of the sink device in a source product description (SPD) infoframe.

7. A source device comprising:
   an interface configured to transmit content to a sink device, which reproduces the content; and
   a processor configured to control the interface to transmit, to the sink device, image quality-related data along with the content such that a scene from among a plurality of scenes forming the content is transmitted with the image quality-related data regarding a next scene to be output after the scene.

8. The source device of claim 7, wherein the processor is further configured to divide the image quality-related data regarding the next scene to be output, and control the interface to transmit, to the sink device, the image quality-related data divided by the processor.

9. The source device of claim 8, wherein the interface is further configured to transmit, to the sink device, at least one of: information about division of the image quality-related data, information about a time at which the scene transmitted to the sink device is changed, information about the scene transmitted to the sink device, and information about the image quality-related data transmitted to the sink device.

10. The source device of claim 7, wherein:
the processor is further configured to determine whether or not the sink device is able to perform an image quality improvement process based on extended display identification data (EDID) received by the interface from the sink device, and
in response to the processor determining that the sink device is able to perform the image quality improvement process, the interface transmits the image quality-related data to the sink device.

11. An image quality improvement processing method comprising:
receiving, from a source device, content and image quality-related data such that a scene, from among a plurality of scenes forming the content, is received with the image quality-related data regarding a next scene to be output after the scene;
storing the received image quality-related data; and
performing an image quality improvement processing to the next scene using the stored image quality-related data.

12. The image quality improvement processing method of claim 11, wherein the image quality-related data is received in a divided form from the source device.

13. The image quality improvement processing method of claim 12, further comprising:
determining a number of the divided image quality-related data and an order of the divided image quality-related data based on information received from the source device; and
restoring the divided image quality-related data to original image quality-related data which is the same as before the image quality-related data is divided.

14. The image quality improvement processing method of claim 11, further comprising:
outputting the content comprising the plurality of scenes, wherein the performing the image quality improvement process comprises determining a time at which a scene is changed based on information received from the source device, and performing the image quality improvement processing to the next scene using the stored image quality-related data during the outputting of the next scene.

15. The image quality improvement processing method of claim 11, further comprising:
determining a scene number of the next scene based on information received from the source device; and
determining whether the stored image quality-related data is applicable to the next scene based on the determined scene number.

16. The image quality improvement processing method of claim 11, wherein the receiving from the source device is through a High-Definition Multimedia Interface (HDMI), and
wherein the image quality-related data is received in a source product description (SPD) infoframe.

17. A method of controlling a source device, the method comprising:
obtaining content and image quality-related data;
transmitting, to a sink device which reproduces the content, the content and the image quality-related data such that a scene from among a plurality of scenes forming the content is transmitted with the image quality-related data regarding a next scene to be output after the scene.

18. The control method of claim 17, further comprising dividing the image quality-related data regarding the next scene to be output, and wherein the transmitting comprises transmitting, to the sink device, the divided image quality-related data.

19. The control method of claim 18, further comprising transmitting, to the sink device, at least one of: information about division of the image quality-related data, information about a time at which the scene transmitted to the sink device is changed, information about the scene transmitted to the sink device, and information about the image quality-related data transmitted to the sink device.

20. The control method of claim 17, further comprising:
receiving extended display identification data (EDID) from the sink device;
determining whether or not the sink device is able to perform an image quality improvement process based on the received EDID; and
in response to the determining indicating that the sink device is able to perform the image quality improvement process, performing the transmitting of the image quality-related data, to the sink device.

21. The sink device of claim 1, wherein the image quality-related data comprises information about the next scene when the next scene is originally produced on the source device.

22. The sink device of claim 1, wherein the image quality-related data for the next scene is transmitted from the source device to the sink device between transmission of image data for the scene and comprises at least two of brightness attributes, colorimetry attributes, resolution, and sharpness, of the original next scene when reproduced by the source device.

* * * * *